(12) United States Patent
Comps et al.

(10) Patent No.: US 7,386,782 B2
(45) Date of Patent: Jun. 10, 2008

(54) METHOD FOR SYNCHRONIZING A MULTIMEDIA FILE

(75) Inventors: Christophe Comps, Cestas (FR); Daniel Boudet, Paris (FR); Xavier Sarremejean, Vaureal (FR)

(73) Assignee: Alcatel, Paris (FR)

( * ) Notice: Subject to any disclaimer, the term of this patent is extended or adjusted under 35 U.S.C. 154(b) by 351 days.

(21) Appl. No.: 10/380,288

(22) PCT Filed: Sep. 13, 2001

(86) PCT No.: PCT/FR01/02844

§ 371 (c)(1),
(2), (4) Date: Mar. 12, 2003

(87) PCT Pub. No.: WO02/23912

PCT Pub. Date: Mar. 21, 2002

(65) Prior Publication Data

US 2004/0098365 A1   May 20, 2004

(51) Int. Cl.
*G06F 17/00* (2006.01)
*G06F 17/20* (2006.01)

(52) U.S. Cl. ............................ 715/203; 715/201

(58) Field of Classification Search ............ 715/500.1, 715/203, 201
See application file for complete search history.

(56) References Cited

U.S. PATENT DOCUMENTS

| | | | | |
|---|---|---|---|---|
| 5,333,299 A | * | 7/1994 | Koval et al. ............... | 713/400 |
| 5,471,576 A | * | 11/1995 | Yee .......................... | 715/500.1 |
| 5,487,167 A | * | 1/1996 | Dinallo et al. ........... | 715/500.1 |
| 5,602,356 A | * | 2/1997 | Mohrbacher ................. | 84/609 |
| 5,642,171 A | * | 6/1997 | Baumgartner et al. ...... | 348/515 |
| 5,675,511 A | * | 10/1997 | Prasad et al. ................ | 715/203 |
| 5,680,639 A | * | 10/1997 | Milne et al. ............. | 715/500.1 |
| 5,701,511 A | * | 12/1997 | Smith ....................... | 715/500.1 |
| 5,737,531 A | * | 4/1998 | Ehley .......................... | 709/208 |
| 5,751,280 A | | 5/1998 | Abbott et al. | |
| 5,754,783 A | * | 5/1998 | Mendelson et al. ......... | 709/217 |
| 5,768,607 A | | 6/1998 | Drews et al. | |
| 5,794,018 A | * | 8/1998 | Vrvilo et al. ............... | 713/400 |
| 5,808,987 A | * | 9/1998 | Oda et al. .................. | 369/47.2 |
| 5,822,537 A | * | 10/1998 | Katseff et al. ............. | 709/231 |
| 5,826,102 A | * | 10/1998 | Escobar et al. .......... | 715/500.1 |

(Continued)

OTHER PUBLICATIONS

Auffret, Gwendal, et al., "Audiovisual-based Hypermedia Authoring: Using Structured Representations for Efficient Access to AV Documents", Hypertext '99, Darmstadt, Germany, Feb. 1999, pp. 169-178 [ACM 1-58113-064-3/99/2].*

(Continued)

*Primary Examiner*—Jean B Fleurantin
*Assistant Examiner*—Robert Stevens
(74) *Attorney, Agent, or Firm*—Sughrue Mion, PLLC

(57) ABSTRACT

The invention concerns a method for synchronizing data in a multimedia document (50), said document comprising at least two separate computer files (track1, track2) called the first file, the second file, etc., in which method: there is stored in the first file, in the second file, etc., respectively data of a first type, of a second type, etc., said data being grouped in the form of at least one event-related command characterizing an event, said event being either important or unimportant,—at least one synchronization command is inserted in each file, characterized in that said synchronization command is inserted before each event-related command characterizing an important event.

14 Claims, 2 Drawing Sheets

U.S. PATENT DOCUMENTS

| | | | | |
|---|---|---|---|---|
| 5,861,880 | A * | 1/1999 | Shimizu et al. | 715/500.1 |
| 5,902,949 | A * | 5/1999 | Mohrbacher | 84/609 |
| 6,006,241 | A * | 12/1999 | Purnaveja et al. | 715/512 |
| 6,016,166 | A * | 1/2000 | Huang et al. | 348/515 |
| 6,148,139 | A * | 11/2000 | Cookson et al. | 386/95 |
| 6,173,317 | B1 * | 1/2001 | Chaddha et al. | 709/219 |
| 6,177,928 | B1 * | 1/2001 | Basso et al. | 715/500.1 |
| 6,195,701 | B1 * | 2/2001 | Kaiserswerth et al. | 709/231 |
| 6,230,172 | B1 * | 5/2001 | Purnaveja et al. | 715/205 |
| 6,288,990 | B1 * | 9/2001 | Fujiie et al. | 369/47.21 |
| 6,334,026 | B1 * | 12/2001 | Xue et al. | 386/98 |
| 6,349,286 | B2 * | 2/2002 | Shaffer et al. | 704/503 |
| 6,415,135 | B1 * | 7/2002 | Salomaki | 455/45 |
| 6,449,653 | B2 * | 9/2002 | Klemets et al. | 709/231 |
| 6,453,355 | B1 * | 9/2002 | Jones et al. | 709/230 |
| 6,480,902 | B1 * | 11/2002 | Yuang et al. | 709/248 |
| 6,490,553 | B2 * | 12/2002 | Van Thong et al. | 704/211 |
| 6,512,778 | B1 * | 1/2003 | Jones et al. | 370/465 |
| 6,564,263 | B1 * | 5/2003 | Bergman et al. | 709/231 |
| 6,611,537 | B1 * | 8/2003 | Edens et al. | 370/503 |
| 6,631,522 | B1 * | 10/2003 | Erdelyi | 725/53 |
| 6,665,835 | B1 * | 12/2003 | Nicol et al. | 715/500.1 |
| 6,744,763 | B1 * | 6/2004 | Jones et al. | 370/394 |
| 6,771,703 | B1 * | 8/2004 | Oguz et al. | 375/240.03 |
| 6,792,615 | B1 * | 9/2004 | Rowe et al. | 725/37 |
| 6,871,006 | B1 * | 3/2005 | Oguz et al. | 386/68 |
| 2001/0014891 | A1 * | 8/2001 | Hoffert et al. | 707/104.1 |
| 2002/0116361 | A1 * | 8/2002 | Sullivan | 707/1 |
| 2002/0159519 | A1 * | 10/2002 | Tabatabai et al. | 375/240.01 |
| 2004/0017389 | A1 * | 1/2004 | Pan et al. | 345/723 |
| 2004/0103372 | A1 * | 5/2004 | Graham | 715/513 |

OTHER PUBLICATIONS

Bulterman, Dick, "Embedded Video in Hypermedia Documents: Supporting Integraion and Adaptive Control", ACM Transactions on Infromation Systems, vol. 13 No. 4, © 1995, pp. 440-470 [ACM 1046-8188/95/1000-0440].*

Agarwal, Nipun, et al., "Synchronization of Distributed Multimedia Data in an Application-Specific Manner", Multimedia '94, San Francisco, CA, Oct. 1994, pp. 141-148.*

Hürst, W., et al., "A Synchronization Model for Recorded Presentations and Its Relevance for Information Retrieval", Multimedia '99, Orlando, FL, Oct. 1999, pp. 333-342.*

Hać, Anna, et al., "Synchronization in Multimedia Data Retrieval", International Journal of Network Management, vol. 7, © 1997, pp. 33-62.*

Chen, Herng-Yow, et al., "An RTP-based Synchronized Hypermedia Live Lecture System for Distance Education", Multimedia '99, Orlando, FL, Oct. 1999, pp. 91-99.*

Li, Li, et al., "Real-time Synchronization Control in Multimedia Distributed Systems", ACM SIGCOMM Computer Communication Review, vol. 22, issue 3, Jul. 1992, pp. 79-87 (plus citation page).*

Gringeri, Steven, et al., "Robust Compression and Transmission of MPEG-4 Video", Multimedia '99, Orlando, FL, Oct. 1999, pp. 113-120.*

Courtiat, Jean-Pierre, et al., "Towards a New Multimedia Synchronizatin Mechanism and its Formal Specification", Multimedia '94, San Francisco, CA, Oct. 1994, pp. 133-140.*

Li, Lain, et al., "MPEG-2 Coded- and Uncoded- Stream Synchronization Control for Real-Time Multimedia Transmission and Presentation over B-ISDN", Multimedia '94, San Francisco, CA, Oct. 1994, pp. 239-246.*

Mukhopadhyay, Sugata, et al., "Passive Capture and Structuring of Lectures", ACM Multimedia '99, Orlando, FL, Oct. 1999, pp. 477-487.*

Steinmetz, Rafl, "Synchronization Properties in Multimedia Systems", IEEE Journal on Selected Areas in Communications, vol. 8, Issue 3, Apr. 1990, pp. 401-412.*

Herman, Ivan, et al., "A Standard Model For Multimedia Synchronization: PREMO synchronization Objects", Multimedia Systems, vol. 6, No. 2, Mar. 1998, pp. 88-101.*

Yuang, Maria C., et al., "DMTS: A Distributed Multimedia Teleworking System", Multimedia Tools and Applications, vol. 7, No. 3, Nov. 1998, pp. 227-240.*

Ehley, Lynnae, et al., "Evaluation of Multimedia Synchronization Techniques", Proc. of the Intern'l Conf. on Multimedia Computing and Systems, Boston, MA, May 15-19, 1994, pp. 514-519.*

Jacobs, Martin, et al., "Specification of Synchronizaton in Multimedia Conferencing Services Using the TINA Lifecycle Model", Distrib. Syst. Engng., vol. 3, © 1996, pp. 185-196.*

Chen Herng-Yow et al, "Multisync: A Synchronization Model for Multimedia Systems", IEEE Journal on Selected Areas in Communications, IEEE, Inc. NY, vol. 14, No. 1, 1996, pp. 238-248, XP000548825.

F. Kretz et al, "Coded Representation of multimedia and Hypermedia Information Objects: Towards the MHEG Standard", Signal Processing. Image Communication, Elsevier Science Publishers, Amsterdam, NL, vol. 4, Nr. 2, pp. 113-128 XP000273158 (c) 1992.

M. D. Eyles, Generic Aspects of Multimedia Presentation BT Technology Journal, GB, BT Laboratories, vol. 13, Nr. 4, pp. 32-43, XP000538878 (c) 1995.

* cited by examiner

FIG_1
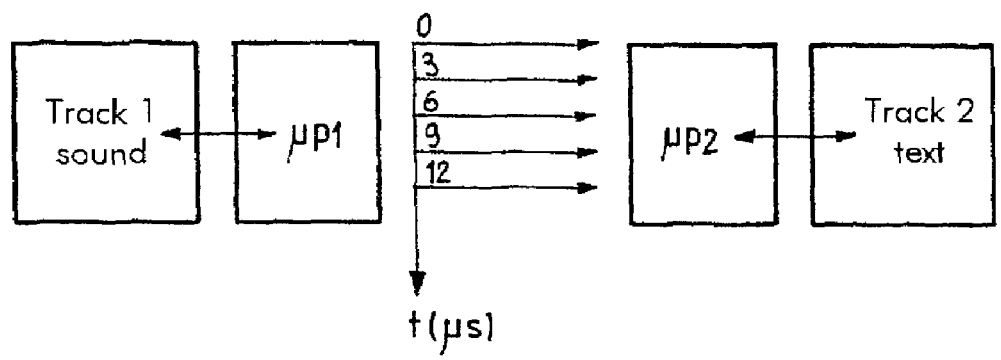
PRIOR ART
FIG_2
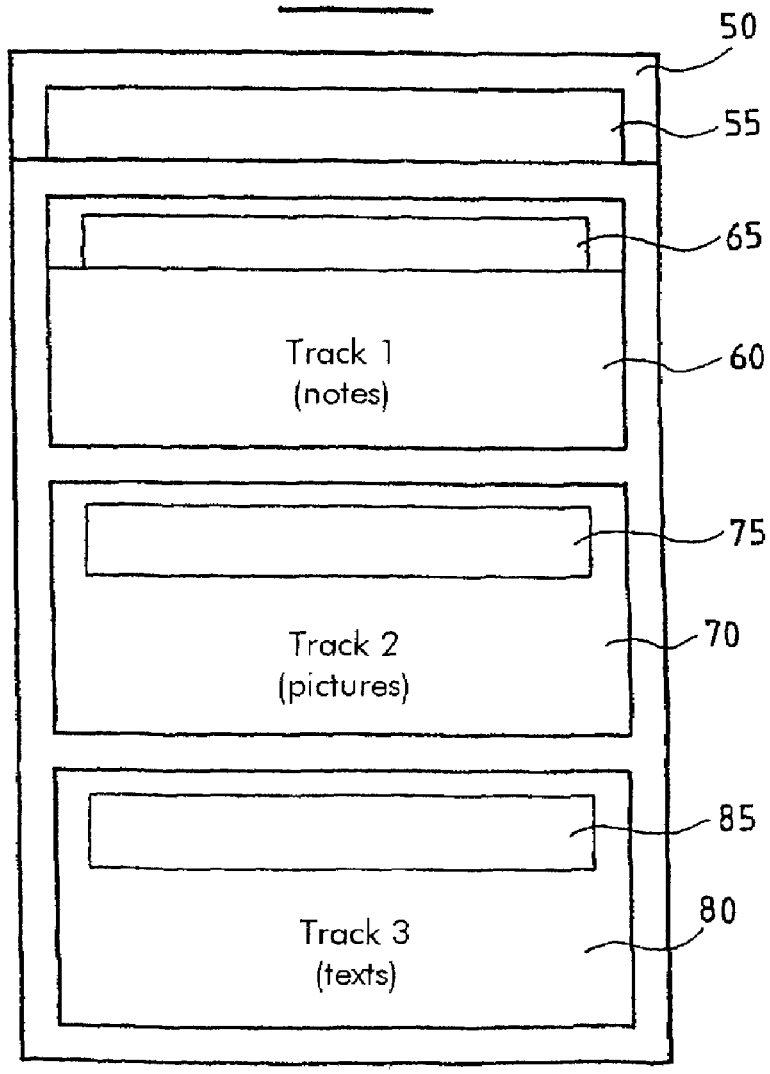

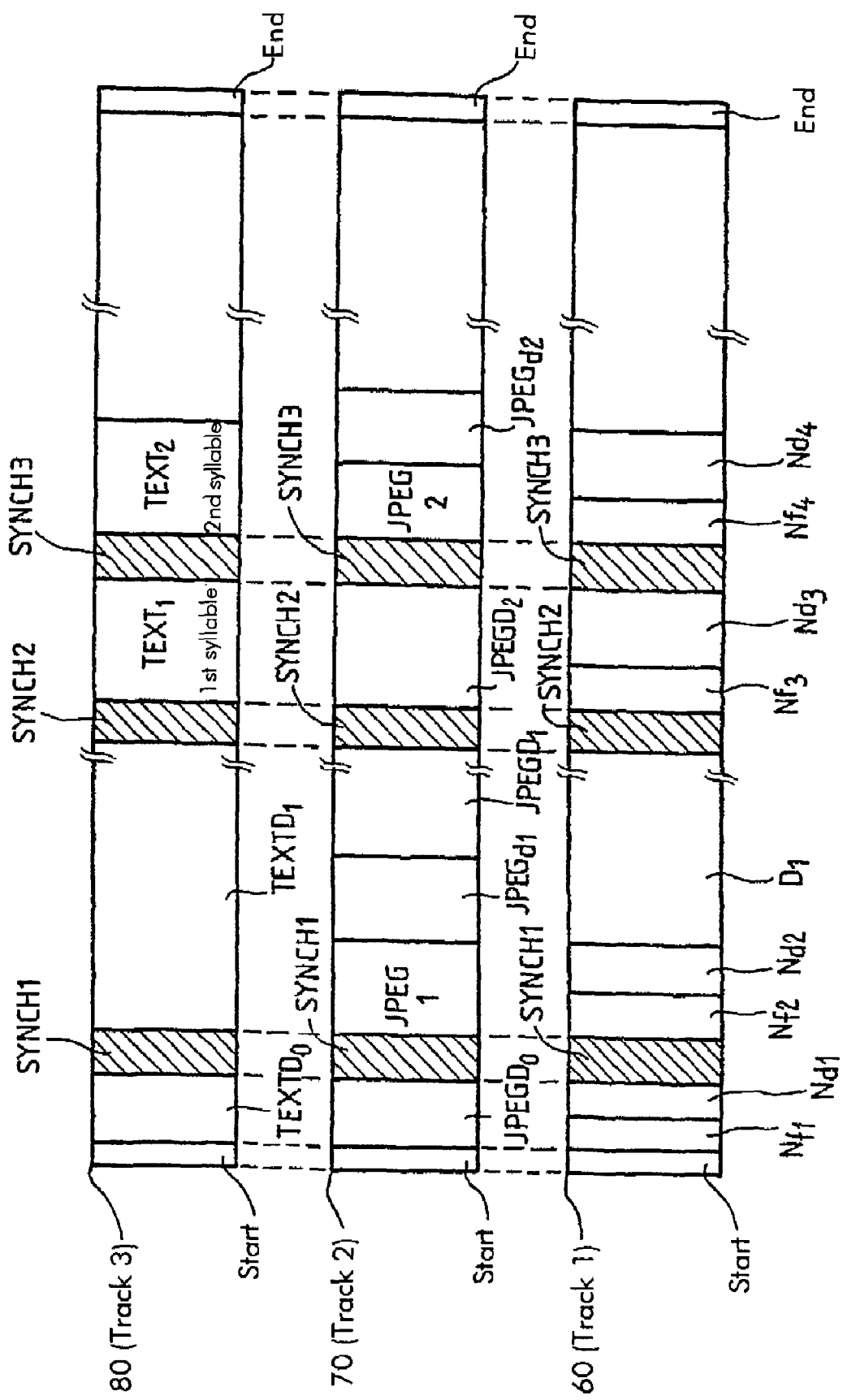

METHOD FOR SYNCHRONIZING A MULTIMEDIA FILE

The present invention relates to a method of synchronizing different types of data in a multimedia file. It applies, for example, to portable systems such as mobile radio terminals, pocket computers or any other equipment that can have multimedia capabilities and for which the size of multimedia files and the computation power needed to process them constitute a problem.

There are very many monomedia files, i.e. files relating to only one particular type of data, such as the JPEG (Joint Photographic Expert Group) format for storing pictures or the RTF (Rich Text File) format for storing text.

The expression "multimedia file" generally refers to integrating different types of data (such as pictures, sound and text) in the same file. Each type of data is contained in a given track. Each track is organized in the form of a series of commands. Each track is scanned by a microprocessor. Each microprocessor executes, at the same time as the others, commands from one track or simultaneous commands from more than one track and can present the data, via different interfaces, to a user of an equipment with multimedia capabilities. The interfaces can be a screen for text and picture data and a loudspeaker for audio data. The user therefore sees text and pictures whilst hearing sounds.

The problem is therefore to match the text to the music and the pictures, i.e. to synchronize the different types of data contained in the same multimedia file.

Each microprocessor, associated with each track containing one type of data uses an oscillator. Each oscillator produces a signal with a frequency slightly different from those of the other oscillators. Also, the software executed by each processor can be based on different operating systems, which drift with time in dissimilar ways. Thus two microprocessors that begin to read their respective tracks at the same time are eventually no longer synchronized with each other. For example, if the microprocessor for the sound data track is lagging behind the microprocessor for the text data track, the text of a phrase will be displayed before the sung phrase is heard.

The prior art solution is temporal synchronization.

In the FIG. 1 example, the microprocessor $\mu p_1$, which reads the track 1 containing sound, sends synchronization data every 3 µs to the microprocessor $\mu p_2$, which reads the track 2 containing text. The synchronization data can optionally be stored in the multimedia file.

Thus the microprocessor $\mu p_2$ verifies every 3 µs whether its clock is synchronized to that of the first microprocessor $\mu p_1$. If the microprocessor $\mu p_2$ finds that it is in advance of the other one, it calculates the time difference and stops reading track 2 for that period of time. It then restarts in synchronism with the microprocessor $\mu p_1$. It is apparent that the better the synchronization required, the greater the quantity of synchronization data that has to be sent and the more frequently it has to be sent.

In mobile terminals there are severe file size constraints. The available memory is limited for reasons of overall size and battery life. What is more, multimedia files must be downloadable from a server center in a reasonable time, which is directly dependent on the file size.

Storing recurrent synchronization data is costly in terms of memory: the flow of data exchanged is burdened with many exchanges of synchronization data, which overloads the memory.

The above solution also has a further and major disadvantage: the synchronization data can reach the microprocessor $\mu p_2$ while it is in the middle of displaying a phrase. The display of the phrase is then stopped short, and the user does not receive the impression of fluid presentation of data.

The object of the present invention is to reduce the size of multimedia files, to optimize the quantity of data exchanged, and to provide optimum synchronization.

To this end, the invention provides a method of synchronizing data in a multimedia document (50) comprising at least two separate data files (track1, track2) referred to as the first file, the second file, etc., in which method:

data of a first type, of a second type, etc. is stored in the first file, in the second file, etc., respectively, and grouped into the form of at least one event-related command characterizing an important event or an unimportant event, and at least one synchronization command is inserted into each file, which method is characterized in that said synchronization command is inserted before each event-related command characterizing an important event.

The method is advantageously characterized in that the important event corresponds to a command to display a text, a command to display a picture, or a command to reproduce a sound.

The invention also provides a device for synchronizing data in a multimedia file containing at least one track in which said data is stored and at least one synchronization command in each track, said device having first means for reading the data of each track and second means enabling the first means to communicate with each other, the data communicated between said first means concerning the occurrence of a synchronization command. The device is characterized in that one of the first data reading means is designated as having the highest priority and forces the other first means to synchronize with it.

The invention and its advantages will become clearer in the course of the following description with reference to the accompanying drawings.

FIG. 1, already described, represents the synchronization of a multimedia file in the prior art.

FIG. 2 is a diagram of a multimedia file conforming to the invention.

FIG. 3 is a detailed view of tracks in a multimedia file.

The data in a multimedia file according to the invention can comprise either time values or sound, text or picture coding values. The time values can represent a note duration, an image display time, a track start or end time, or a waiting time between two events. According to the invention, the tracks of the multimedia file also include synchronization commands related to the various events included in the track (note, picture, text, etc.).

FIG. 2 is a diagram showing the structure of a multimedia file according to the invention.

The multimedia file 50 includes a header 55 and tracks 60, 70 and 80. According to the invention, a multimedia file can include a number of tracks from 1 to n and FIG. 2 merely represents one example of this kind of file.

The header 55 includes data that is common to all of the tracks and is not described in detail here.

Each track of the file 50 can contain a single type of data. For example, track 60 can be a MIDI (Musical Instrument Digital Interface) format track for sound, track 70 can contain a sequence of pictures, and track 80 can contain sequences of texts. The different tracks may be intended to be scanned by microprocessors and presented simultaneously to a user. The different microprocessors therefore scan the tracks at the same time.

Each track 60, 70 and 80 has a respective header 65, 75 and 85. Each header contains an indicator of the type of data contained in the track. Thus the microprocessor able to read MIDI data knows from this indicator which track to read.

Each track also contains data organized in the form of commands which are executed sequentially by the microprocessor (for example to display a picture or a text).

FIG. 3 shows one example of a structure of three tracks contained in a multimedia file.

In this example:

Track 60 or track 1 contains only MIDI sound data. The sound data could consist of sampled sounds (speech, miscellaneous noises such as applause or microphone noise, etc.).

Track 70 or track 2 contains only data corresponding to sequences of JPEG images. This data could equally be video data.

Track 80 or track 3 contains only data corresponding to text messages.

Each track has a Start field for starting presentation to the user and an End field for ending presentation to the user.

Track 1 contains data relating to sound. A first field $Nf_1$ represents the frequency of a first note and a second field $Nd_1$ represents its duration. Likewise, the fields $Nh_2$ and $Nd_2$ define a second note. The field $D_1$ represents a waiting time before presenting the subsequent notes of the track.

The fields $Nh_3$ and $Nd_3$ respectively represent the frequency and the duration of a third note.

Thus fields defining a note or a waiting time can follow on from each other in track 1.

Track 2 contains data corresponding to sequences of JPEG images. In this example, two JPEG images represented by the fields JPEG1 and JPEG2 must be presented to the user for a given time represented by the field $JPEGd_1$ for the image JPEG1 and the field $JPEGd_2$ for the image JPEG2. The fields $JPEGD_0$, $JPEGD_1$ and $JPEGD_2$ represent waiting times before or between images.

Track 3 contains data corresponding to text messages. In this example two syllables represented by the fields TEXT1 and TEXT2 must be presented to the user. The fields $TEXTD_0$ and $TEXTD_1$ represent waiting times before a text.

The synchronization commands are represented by fields SYNCHi for i from 1 to n.

The synchronization commands are not temporal commands, as in the prior art, but are instead dependent on a specific event. Thus the fields SYNCHi are not present in the tracks at regular time intervals.

In the FIG. 3 example, musical notes included in the track 1 data must not be interrupted. Synchronizing the three tracks must not entail interrupting the music heard by the user. The microprocessor dedicated to reading this track is considered to be the master.

It forces the other microprocessors in charge of the other tracks, referred to as slaves, to synchronize with it.

Some notes must correspond to the display of an image or a syllable.

In this example, the first fields $NF_1$ and $Nd_1$ correspond to a first note. The second note, corresponding to the second fields $NF_2$ and $Nd_2$, must be heard at the moment the first picture is displayed, corresponding to the field JPEG1 of track 2. Then, after a waiting time corresponding to the field $D_1$, the third note, corresponding to the third fields $Nf_3$ and $Nd_3$, must be heard at the moment that the first syllable is displayed, corresponding to the field TEXT1 of track 1. Finally, the fourth note, corresponding to the fourth fields $Nf_4$ and $Nd_4$, must be heard at the moment at which are simultaneously displayed the second picture, corresponding to the field JPEG1 in track 2, and the second syllable, corresponding to the field TEXT2 in track 1.

Thus the first synchronization command, which corresponds to the field SYNCH1, is:
between the fields $Nd_1$ and $Nf_2$ in track 1,
between the fields $JPEGD_0$ and JPEG1 in track 2,
between the fields $TEXTD_0$ and $TEXTD_1$ in track 3.

The second synchronization command, which corresponds to the field SYNCH2, is:
between the fields $D_2$ and $Nf_3$ in track 1,
between the fields $JPEGD_1$ and $JPEGD_2$ in track 2,
between the fields $TEXTD_1$ and TEXT in track 3.

The third synchronization command, which corresponds to the field SYNCH3, is:
between the fields $Nd_3$ and $Nf_4$ in track 1,
between the fields $JPEGD_2$ and JPEG2 in track 2,
between the fields TEXT1 and TEXT2 in track 3.

When the multimedia document is presented to the user, the microprocessors scan all the tracks at the same time. Two situations arise, according to whether the slave microprocessors are lagging behind or in advance of the master microprocessor. Each slave microprocessor can receive data concerning the synchronization commands from the master microprocessor.

The master microprocessor, which is dedicated to track 1, reaches the first synchronization command, corresponding to the field SYNCH1, and sends first synchronization data to the other microprocessors.

Two situations arise:

If, at the moment it receives data, the slave microprocessor dedicated to track i, which is lagging behind, has not yet encountered the field SYNCH1 in track i, it continues to scan its file without executing the commands encountered, in order to reach the field SYNCH1 as quickly as possible. It then resumes execution of commands encountered after the field SYNCH 1.

If, before receiving the data, the slave microprocessor dedicated to track i had already reached the field SYNCH1, it stops reading the fields of track i until it receives the first synchronization data sent by the master microprocessor. It then resumes reading the fields of track i and executes the commands described.

Thus each important command, i.e. a command whose execution must not be interrupted, is represented by a given field preceded by a field representing a synchronization command. The synchronization command is at the same place in all the other tracks. Because of this, different tracks are resynchronized before any important command, if necessary.

Thus the invention synchronizes data in a multimedia file without overloading the memory with unnecessary synchronization data, and thereby restricting transfers of synchronization data between the microprocessors, without overloading the tracks with large quantities of unnecessary synchronization data, and most importantly without the execution of an important command stopping in the middle.

The invention claimed is:

1. A method of synchronizing data in a multimedia document which comprises at least first and second data files, the method comprising:
   storing data of a first type in the first data file and data of a second type in the second data file, wherein the data of the first type and the data of the second type are stored sequentially in a plurality of fields of the first data file and the second data file, respectively, and at least one event-related command, which identifies an event which is executed during reproduction of the multimedia document, is stored in a field of the first data file and the second data file, and inserting at least one synchronization command into the first data file and the second data file, wherein the at least one synchronization command is inserted before the at least one event-related command which is stored in the field of the first data file and the second data file and each synchronization command which is included in the first data file is repeated identically in the second data file of the multimedia document, designating one of the first data file and the second data file as a priority file, reading the first data file, and reading the second data file, wherein if the first data file is designated as the priority file and a synchronization command is encountered in the first data file prior to encountering a corresponding synchronization command in the second data file, reading the plurality of fields of the second data file in sequence without executing event related commands which are stored in the plurality of fields of the second data file, and wherein if the corresponding synchronization command is encountered in the second data file, execution of event related commands in the second data file resumes.

2. The method according to claim 1, wherein the event, which is identified by the at least one event related command, is one of a command to display a text message, a command to display a picture, and a command to reproduce a sound.

3. The method according to claim 1, wherein a synchronization command which is included in the first data file is repeated identically in the second data file of the multimedia document such that execution of a first synchronization command which is included in the first data file at the beginning of the first file is concomitant with execution of the first synchronization command which is included in the second data file at the beginning of the second data file.

4. A method according to claim 3, wherein:
the first data file and the second data file are read simultaneously and successive event-related commands in the first data file and the second data file are executed.

5. The method according to claim 1, wherein each synchronization command is uniquely identified.

6. The method according to claim 1, wherein each synchronization command of each event to be executed simultaneously is numbered identically from one file to another.

7. The method according to claim 1, wherein the first data file is a first track of the multimedia document and the second data file is a second track of the multimedia document.

8. The method according to claim 1, wherein the first data file and the second data file are separate data files.

9. The method according to claim 1, further comprising:
if the second data file is designated as the priority file, and a synchronization command is encountered in the second data file prior to encountering a corresponding synchronization command in the first data file, reading the plurality of fields of the first data file in sequence without executing event related commands which are stored in the plurality of fields of the first data file, wherein execution of event related commands in the first data file resumes after the corresponding synchronization command is encountered in the first data file.

10. The method according to claim 1, wherein if the first data file is designated as a priority file and a synchronization command is encountered in the second data file prior to encountering a corresponding synchronization command in the first data file, reading of the plurality of fields of the second data file is stopped and reading of the plurality of fields of the first data file in sequence and execution of event-related commands, which are stored in the plurality of fields of the first data file, is continued, wherein reading of the second data file and execution of event related commands in the second data file resumes after the corresponding synchronization command is encountered in the first data file.

11. The method according to claim 1, wherein if the second data file is designated as the priority file and a synchronization command is encountered in the first data file prior to encountering a corresponding synchronization command in the second data file, reading of the plurality of fields of the first data file is stopped and reading of the plurality of fields of the second data file in sequence and execution of event-related commands, which are stored in the plurality of fields of the second data file, is continued, wherein reading of the first data file and execution of event related commands in the first data file resumes after the corresponding synchronization command is encountered in the second data file.

12. The method according to claim 1, wherein the event related commands are read in sequence without skipping fields of the first data file if the synchronization command is encountered in the first data file prior to encountering the corresponding synchronization command in the second data file.

13. A device for implementing a method of synchronizing data in a multimedia document which comprises at first and second data files, the method comprising:

storing data of a first type in the first data file and data of a second type in the second data file, wherein the data of the first type and the data of the second type are stored sequentially in a plurality of fields of the first data file and the second data file, respectively, and at least one event-related command, which identifies an event which is executed during reproduction of the multimedia document, is stored in a field of the first data file and the second data file, reading the first data file, and reading the second data file, inserting at least one synchronization command into the first data file and the second data file, wherein the at least one synchronization command is inserted before the at least one event-related command which is stored in the field of the first data file and the second data file and each synchronization command which is included in the first data file is repeated identically in the second data file of the multimedia document, wherein if a synchronization command is encountered in the first data file prior to encountering a corresponding synchronization command in the second data file, the first data file is designated as a priority file and the plurality of fields of the second data file are read in sequence without executing event related commands which are stored in the plurality of fields of the second data file, and wherein if the corresponding synchronization command is encountered in the second data file, execution of event related commands in the second data file resumes, the device including reading means for reading data in said first data file and said second data file and communication means for communicating data with said reading means concerning reading of a synchronization command in a file.

14. The device according to claim 13, wherein the event related commands are read in sequence without skipping fields of the first data file if the synchronization command is encountered in the first data file prior to encountering the corresponding synchronization command in the second data file.

* * * * *